Jan. 6, 1931.  F. H. OWENS  1,787,592
MOTION PICTURE DEVICE
Filed Dec. 18, 1926
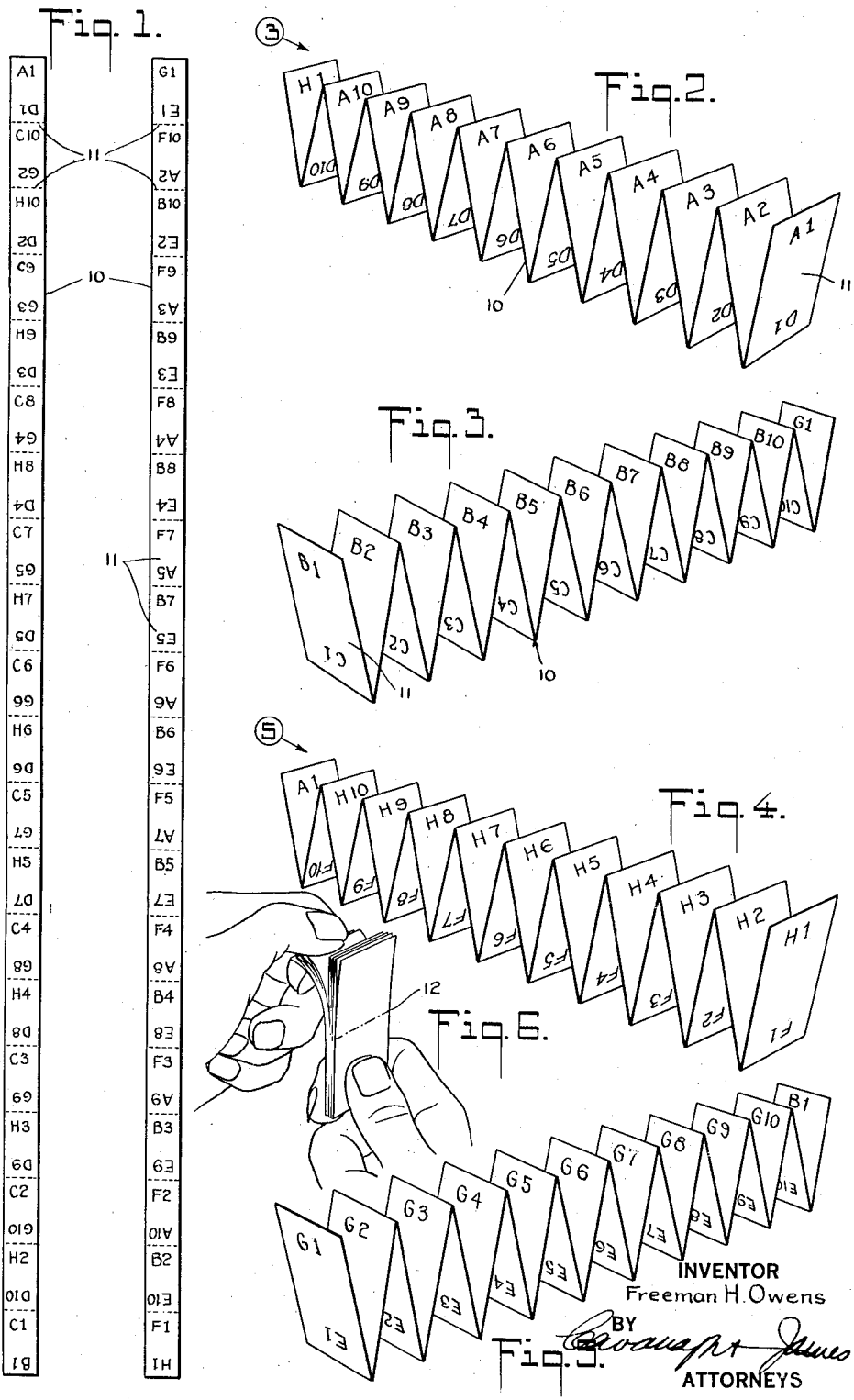

Patented Jan. 6, 1931

1,787,592

UNITED STATES PATENT OFFICE

FREEMAN H. OWENS, OF NEW YORK, N. Y.

MOTION-PICTURE DEVICE

Application filed December 18, 1926. Serial No. 155,569.

This invention relates to the type of motion picture device in which a series of successive pictures are presented to view by thumbing the ends of a series of leaves having the pictures thereon, and thereby giving a motion picture effect to the observer or viewer.

One of the objects of the present invention is to provide a device of the type above described in which a plurality of motion picture series are available to the viewer. As will be more clearly understood from the description hereinafter, any one of the plurality of series may be viewed by the observer by varying the direction in which the pictures are thumbed, or by thumbing the different ends of the pictures, or both.

Another object of the invention is to provide a strip having a plurality of pictures on one side thereof, or on both sides thereof, as desired, the pictures being so disposed and so arranged on said strip that the strip may be readily folded so as to form a folded strip or book which will make available a plural ity of motion picture series when operated in the manner described above.

Another object of this invention is to provide a method of so disposing the pictures of a plurality of motion picture series on a strip, either on one face thereof or on both faces thereof, that the strip may be folded in zigzag fashion and thereby obtain a folded strip or book which will make available a plurality of motion picture series to the viewer when operated in the manner described.

Another object of the invention is to provide a strip having a plurality of motion picture series on one face or on both faces thereof so arranged and disposed that the same may be folded in zigzag fashion in either direction and thereby provide a folded strip or book which will make available a plurality of different motion picture series.

One of the manners in which the present invention may be utilized is to print such strips on one or on both sides thereof in the newspapers or other periodicals. The strip may then be cut out of the periodical as a strip and without any further cutting into portions, the strip may be folded in zigzag fashion and thereby form a folded strip or book which will make available a plurality of different motion picture series.

The invention will be more clearly understood from the following specification and the accompanying drawings.

In the drawings, Fig. 1 shows the arrangement of eight motion picture series on the two sides of the strip.

Fig. 2 shows the strip folded in zigzag fashion and indicates the motion picture series available at each end of the folded strip when viewed from right to left.

Fig. 3 shows a view of the folded strip shown in Fig. 2 when viewed in the direction of the arrow 3 which appears in Fig. 2.

Fig. 4 shows a view of the folded strip when the strip is folded zigzag in the opposite direction.

Fig. 5 shows a view of the folded strip shown in Fig. 4 when viewed in the direction of the arrow 5 which appears in Fig. 4.

Fig. 6 illustrates the manner in which the folded strip or book is used.

In the specific embodiment of the invention illustrated in the drawings, pictures appear on both sides of the strip, thereby giving eight motion picture series indicated by the letters A, B, C, D, E, F, G and H. It is understood, however, that this invention is not limited to the specific number of motion picture series and that the number may be varied as desired.

As shown in the drawings, each series comprises ten pictures which are numbered from 1 to 10. It is understood, however, that this number may be varied as desired.

As is shown in Fig. 1 of the drawings, the strip 10 is divided into a plurality of sections as indicated by the dotted lines 11. Each section carries two pictures disposed longitudinally thereof and preferably disposed in such a manner that the head of one picture is directed towards one end of the strip whereas the head of the other picture is directed toward the other end of the strip.

Any two pictures in any one strip are not in the same series, and as shown in the drawings, which show an embodiment of the invention wherein the maximum number of series are made available, any two adjacent pictures, whether disposed on the same section or on adjacent sections, are in different series. It will also be noted that in the embodiment shown in the drawings, the series of pictures which constitute one consecutive series appear on alternate sections 11.

When the strip shown in Fig. 1 is folded in zigzag fashion, as shown in Fig. 2, and when said strip is compressed and operated in the manner shown in Fig. 6, there is available at one end of said strip the motion picture series A1 to A10 inclusive. When the lower end of the folded strip or book is thumbed in the same direction, the series D1 to D10 becomes available. If, however, the same folded strip be thumbed in the opposite direction, namely, in the direction shown by the arrow 3 which appears in Fig. 2, the series B1 to B10 and C1 to C10 become available to the view. This is clearly illustrated in Fig. 3 of the drawings.

If desired, the strip 10 may be folded in zigzag fashion in the opposite direction from the manner in which it is folded in Figs. 2 and 3. Under these conditions thumbing the folded strip or book at the upper end thereof presents the series H, and thumbing it at the lower end presents the series F. When, however, the same folded strip is thumbed in the opposite direction, indicated by the arrow 5 in Fig. 4, the series G and E become available to the viewer.

It will be observed that, as shown in the drawings, all but one of the pictures of any one series appear on one face of the strip. The picture that appears on the opposite face of the strip is the first one of the series, as shown in the embodiment of the invention illustrated in the drawings. This is a device adopted in the execution of this invention in order to make it possible to utilize all the available space. It is obvious, however, that if desired, this feature of the invention may be eliminated by leaving the corresponding ends of the strip without any pictures. This will reduce the number of pictures in some of the series by one, and thus make it possible to print all of the pictures of a series on one face of the strip. It should also be noted that the above applies only to the series A, B, G and H and does not apply to the other series.

The present invention contemplates that such strips be distributed in the form of strips so that the user may have his choice of folding the strip in zigzag fashion in one direction or the other. It is also contemplated that the user may at will reverse the direction of folding the strip, thus obtaining one set of motion picture series and then another set of motion picture series. If desired, however, the strip may be folded in the manner shown and the sections thereof may be connected together in any manner desired along the dotted line 12, as shown in Fig. 6.

If the strip is to be folded in one manner and permanently connected, then only four motion picture series will be available to the viewer, and under such conditions the pictures will be so disposed on the strip that all of the space is utilized and at the same time showing only four motion picture series. If desired, under such conditions, the folded edges of the strip may be cut so as to make available a greater number of pictures in each series.

Having described my invention, I do not wish to limit it to the specific embodiment thereof shown in the drawings and described in the specification.

I claim:

1. A leaved motion picture book comprising a picture strip folded in zigzag manner into folded leaves, similar fold sections of the leaves having thereon motion picture images forming a motion picture series.

2. A leaved motion picture book comprising a picture strip folded in zigzag manner into folded leaves, the similar fold sections of the leaves on one side of the folds having thereon motion picture images forming a motion picture series and the similar fold sections of the leaves on the opposite side of the folds having thereon motion picture images forming another motion picture series.

3. A leaved motion picture book comprising a picture strip folded in zigzag manner into folded leaves, similar fold sections of the leaves on each of opposite sides of each of the opposite ends of the book having thereon motion picture images forming a motion picture series, whereby a different series may be observed by thumbing either end of the folded strip in either direction.

4. A leaved motion picture book comprising a picture strip folded in zigzag manner into folded leaves, similar fold sections of the leaves having thereon on opposite ends thereof motion picture images forming a plurality of motion picture series, one series being observable with the strip folded in one way and the other series being observable with the strip folded the opposite way.

5. A leaved motion picture book comprising a picture strip folded in zigzag manner into folded leaves, the similar fold sections of the leaves on one side of the folds having thereon on opposite ends thereof motion picture images forming a plurality of motion picture series, and the similar fold sections of the leaves on the opposite side of the folds having thereon on opposite ends thereof motion picture images also forming a plurality of motion picture series whereby different picture series are observable by thumbing the folded strip in either of opposite directions with the strip folded in either of two opposite ways.

6. The combination of claim 5 in which both of the opposite ends of the book are provided with a picture series producing eight different series of motion picture images.

Signed at New York city in the county of and State of New York this 12th day of December, A. D. 1926.

FREEMAN H. OWENS.